United States Patent [19]

Sampson

[11] Patent Number: 5,236,603

[45] Date of Patent: Aug. 17, 1993

[54] METHOD FOR PLASTICS RECYCLING

[76] Inventor: Donald L. Sampson, W. 7716 Rutter Pkwy., Spokane, Wash. 99208

[21] Appl. No.: 717,258

[22] Filed: Jun. 18, 1991

[51] Int. Cl.[5] .............................................. B03B 5/32
[52] U.S. Cl. .................................. 210/770; 210/787; 210/532.2; 209/2; 209/132; 241/19; 241/21; 241/23; 264/37
[58] Field of Search ............... 210/695, 703, 770, 787, 210/499, 323.1, 335, 532.2; 241/19, 21, 23; 209/2, 39, 132; 264/37; 521/40.5, 45, 45.5; 528/489, 503

[56] References Cited

U.S. PATENT DOCUMENTS

| | | | |
|---|---|---|---|
| 4,036,441 | 7/1977 | Basten et al. | 241/20 |
| 4,319,998 | 3/1982 | Anderson | 210/170 |
| 4,379,525 | 4/1983 | Nowick et al. | 241/20 |
| 4,830,188 | 5/1989 | Hannigan et al. | 241/24 |

FOREIGN PATENT DOCUMENTS

0304667  7/1988  European Pat. Off. .

Primary Examiner—Robert A. Dawson
Assistant Examiner—David Reifsnyder
Attorney, Agent, or Firm—Chernoff, Vilhauer et al.

[57] ABSTRACT

The present invention provides improved systems for plastic recycling. In a first embodiment for recycling HDPE milk jugs, a cold water wash step is used to remove bacteria-generated odor from milk jugs. In a second embodiment, a system for recovering PET and HDPE from soda bottles is disclosed. The separation stage utilizes a three-compartment sump to separate HDPE using water as the medium, and two further stages using heavier media for separation of PVC cap liners and aluminum from the PET.

7 Claims, 8 Drawing Sheets

METHOD FOR PLASTICS RECYCLING

FIELD OF THE INVENTION

The invention relates to various systems and processes for the recycling of post-consumer plastics such as rigid (bottle grade) high density polyethylene (HDPE) and polyethylene terepthalate (PET), films (HDPE, LDPE and LLDPE) and polypropylene from medical waste.

BACKGROUND OF THE INVENTION

The recycling of post consumer plastics is a relatively recent phenomenon which is rapidly growing in importance due to growing popular support for recycling and the increased use of plastics in such consumer items as pop bottles and milk bottles. The support is shown in such programs as the widespread "blue box" curbside collection programs, which have been encouraged by greater popular concern for environmental issues, legislation and the increasing cost of waste disposal by land fill. The result is a rapidly growing supply of post consumer plastics for recycling.

The primary criterion for plastic recycling is the purity of the end product. Minute contamination of the recovered plastic can greatly reduce the value of the recovered plastic. Previous plastic recycling technology relies on "float-sink" technology, according to which the target plastic was separated from waste of different specific gravities by grinding the feed material and choosing a liquid of appropriate specific gravity to float off the waste and allow the target plastic to sink, or vice versa. However, this method did not produce an end product of sufficient purity. Recently, hydrocyclones, previously used in mineral separation and other industries, have been applied to plastic separation, and these devices have produced a good improvement over the old technology. For example, European Patent application no. 88112333 published Mar. 1, 1989 discloses a system for recovering plastics which uses a two-stage hydrocyclone step to separate the heavier PET plastics from lighter plastics and other waste. The underflow from the first hydrocyclone in this system feeds the second hydrocyclone and the underflow from the second hydrocyclone is dewatered, dried and sorted.

SUMMARY OF THE INVENTION

The present invention provides improved systems for plastic recycling. In a first embodiment for recycling HDPE milk jugs, a cold water wash step is used to remove bacteria-generated odor from milk jugs. In a second embodiment, a system for recovering PET and HDPE from soda bottles is disclosed. The separation stage utilizes a three-compartment sump to separate HDPE using water as the medium, and two further stages using heavier media for separation of PVC cap liners and aluminum from the PET.

BRIEF DESCRIPTION OF THE DRAWINGS

In drawings which illustrate a preferred embodiment of the invention.

DETAILED DESCRIPTION OF THE PREFERRED EMBODIMENT

Figure 1A:
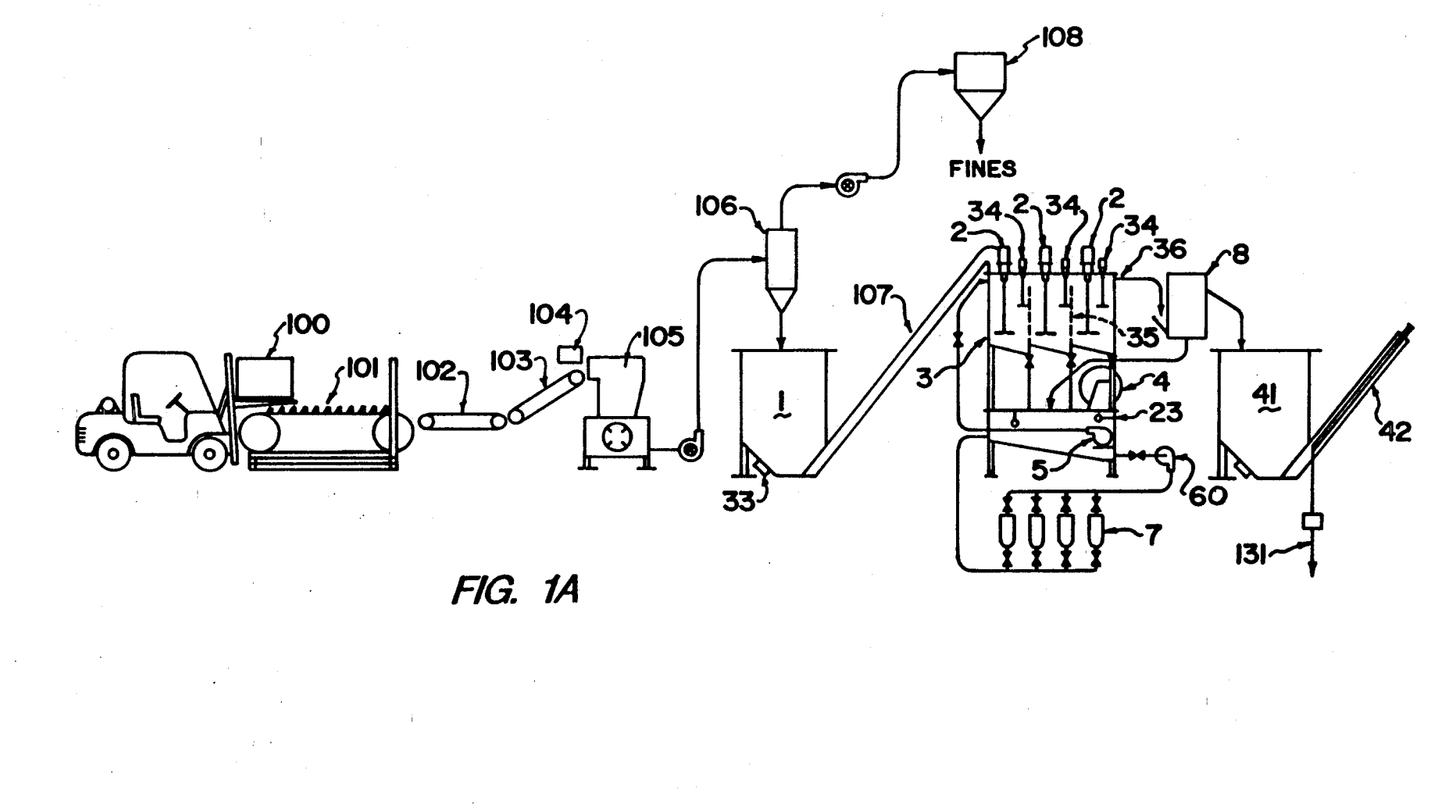
FIG. 1A and 1B is a schematic diagram illustrating a system for recycling high density polyethylene plastic.
Figure 1B:
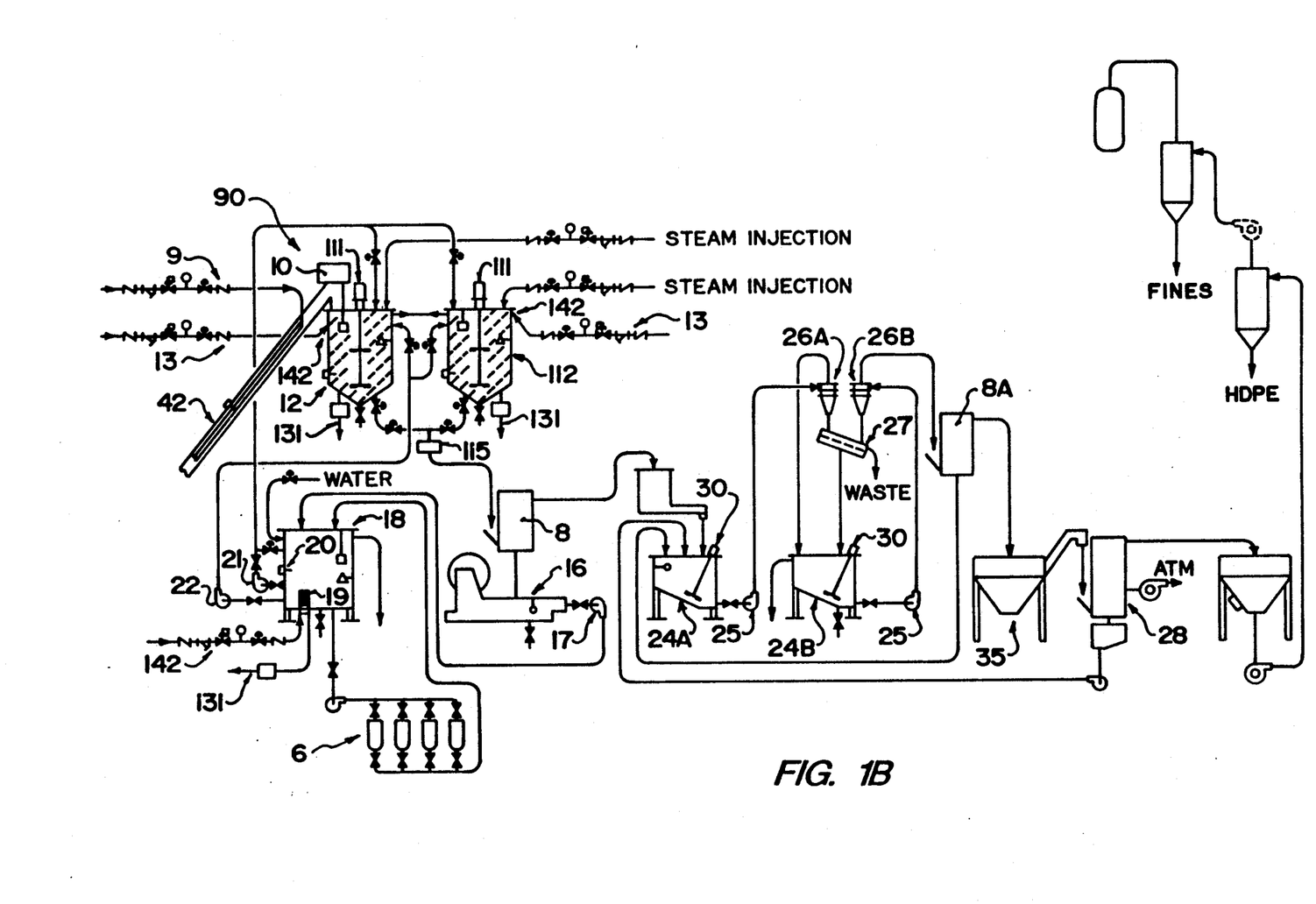

FIG. 1 illustrates schematically a system for recycling high density polyethylene plastic such as milk jugs and household chemical containers. A problem with such jugs is that the smell of the sour milk will be set into the recycled plastic unless the jugs are properly cleaned prior to processing. A hot water wash will also set the smell into the plastic. The present system utilizes a cold water wash. First, the used milk jugs are delivered to the recycling facility in bales 100. After passing through a bale breaker 101, preferably a rotating drum bale breaker, followed by a picking conveyor 102, 103 in which unwanted plastics, metal and other scrap are manually removed and a further metal detector 104 by means of which any further metal pieces are removed, the jugs are granulated in a granulator 105 to about a ⅜ flake size (maximum dimension). The granulated material is fed through an aspirator or air classifier 106 which removes lighter materials such as paper fines by air removal to bin 108.

A surge bin 1, vibrated by bin vibrator 33, receives the elutriated milk jug granules which are conveyed by feed screw 107 to cold water wash bin 3. Cold water (at ambient temperature) and a cold water detergent or low heat cleaner are added to the granulated plastic, with a proportion of plastic to water of between 5:1 and 1:1. This proportion allows a certain scrubbing action between plastic granules. The cold water wash removes remaining milk film from the plastic granules, while preventing the setting of any smell by avoidance of applied heat. The bin 3 is divided into 3 compartments in which turbulence is generated by motor driven mixers 2 and air-actuated pullers 34. Mixers 2 act at a deeper level than pullers 34. Partitions 35 are provided to increase the level of turbulence, with the slurry passing over the top of each partition into the next compartment. A portion of the slurry escapes over the lip 36 after travelling through the three compartments of bin 3 and is passed to dryer 8 (such s manufactured by the Carter-Day Company). The dried solid residue from the dryer 8 is conveyed to surge bin 41 while the removed water passes onto deep bed filter 4. Such filter has a continuous roll of filter material which is discarded after use. Water from the lower level of the deep bed filter is further pumped by fines recovery pump 60 through a series of canister filters 7 or other filtration equipment and returned to the upper level which in turn is recirculated to bin 3 by submersible cold wash recycle pump 5. Make-up water is added at 23.

The cleaned granules in bin 41 are conveyed by screw conveyor 42 to the hot wash system 90 to remove any glue or other soluble impurities. The wet granules may be heated within screw conveyor 42 by a steam heating coils 9, although this is not present in the preferred embodiment. The granules enter a first basin 12 via gate actuator 10. Hot water at a temperature between 180 and 210 degrees F. and a hot water detergent (high heat cleaner) are added to the basin along with the plastic in a water to plastic ratio of between 5:1 and 1:1 by volume. The slurry is heated by steam pipes 13 and temperature is regulated by temperature controls. Steam enters at 142. circulates around the steel basin transferring heat and leaves in the form of condensate at 131. Turbulence is generated in the basin by motor driven agitators 111. The high ratio of plastics solids to water, combined with heat, chemicals, and mechanical mixing over times cycles, cleanses the material. The system utilizes two hot wash scrubbers. One scrubber is emptied while the second is processing. This type of system is commonly referred to as a continuous batch attrition scrubber.

The slurry leaves the basin through valve 115 to enter dryer 8. The plastic from the dryer 8 is conveyed to the separation stage surge bin, while the water is returned to deep bed filter 16 for recycling. The filtered water from filter 16 is pumped to sump 18. The water in sump 18 is heated by steam coils 19, controlled by temperature switch 20. Water from the bottom of sump 18 is filtered further through canister filters 6 or other filtration and returned to the sump 18. Water from the sump at pumps 21 and 22 is returned to basin 12 and basin 112.

The two-compartment separation stage is formed of a two-compartment sump 24, having compartments 24A and 24B shown in FIG. 1B as 2 separate sumps for ease of illustration, each compartment having a motor-driven mixer 30 to generate turbulence. The two compartments are separated by a static screen which permits water to flow between the compartments, but not plastic flakes. The bottom of the sump is angled to the horizontal to increase turbulence and prevent the build-up of solids. A slurry is formed, again in a water to plastic ratio of between 5:1 and 1:1 by volume for pumping to the hydrocyclones 26A and 26B. Slurry from sump compartment 24A is pumped to hydrocyclone 26A with the lower density stream from hydrocyclone 26A proceeding directly to sump compartment 24B and the high density stream from hydrocyclone 26A first passing through vibrating screen 27 to remove heavier waster particles, and then back to sump compartment 24B. The slurry from sump compartment 24B is pumped to hydrocyclone 26B. The lower density stream from hydrocyclone 26B is primarily the pure HDPE and it is pumped to dryer 8A. The high density stream from hydrocyclone 26B is passed again through vibrating screen 27 to remove heavier waste particles, and then back to sump compartment 24B.

The liquid from dryer 8A is returned to sump compartment 24A. The solid dried material goes through a rinse system 35 to remove any remaining traces of impurities. The rinse system sprays fresh water onto the air-driven stream of plastic flakes to remove further impurities. A further drying stage is provided at 28, with water being returned to sump compartment 24A and the dried finished HDPE being taken from this stage.

Pumps 25 are standard centrifugal pumps. Otherwise pumps in the system are recessed impeller centrifugal pumps, except pumps 17, 21 and 22 which are open-faced centrifugal impellers.

Figure 2A:
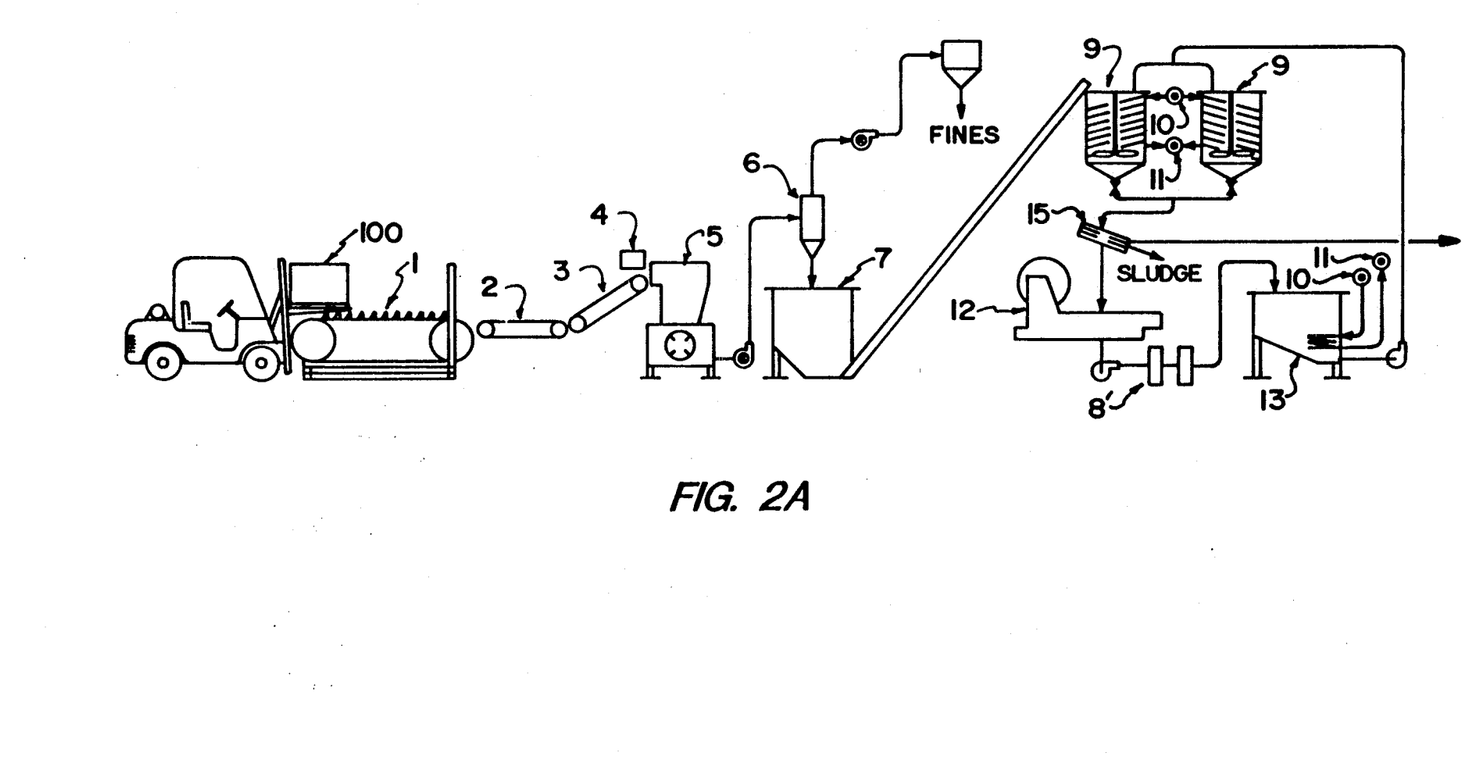
FIG. 2A and 2B is a schematic diagram illustrating a system for recycling high density polyethylene plastic and polyethylene terepthalate.

Looking at FIG. 2, the mixed HDPE/PET line is illustrated. There is no cold water wash step in this line, so milk bottles are not processed, but bales of mixed pop bottles and HDPE bottles are introduced at 1. The initial breaking of bales 100 by bale breaker 1, conveyors 2, 3, metal detector 4, granulator 5 and elutriator 6 are generally as for the milk bottle line above. Surge bin 7 feeds the granulated plastic directly to the hot water wash system 9, which is also the same as noted above, except that a hotter temperature, about 190 to 210 degrees F. is preferred for the hot wash. Steam is introduced at 10 and exits at 11. A dryer or vibrating screen 15 separates the larger solid materials from the waste water which is filtered through deep bed filter 12, canister filters 8 and pumped to sump 13 for reheating and recycling.

Figure 2B:
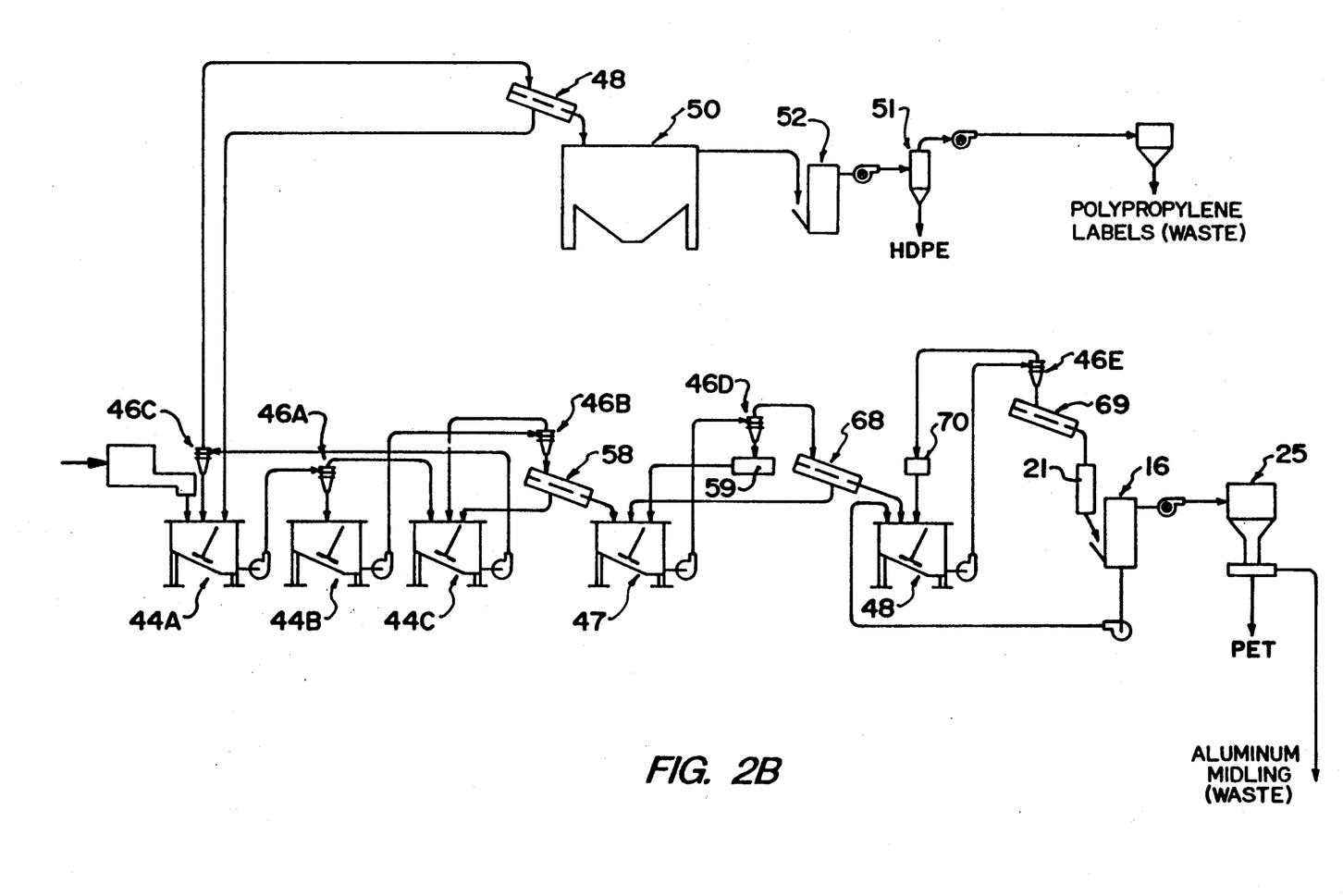
Figure 5:
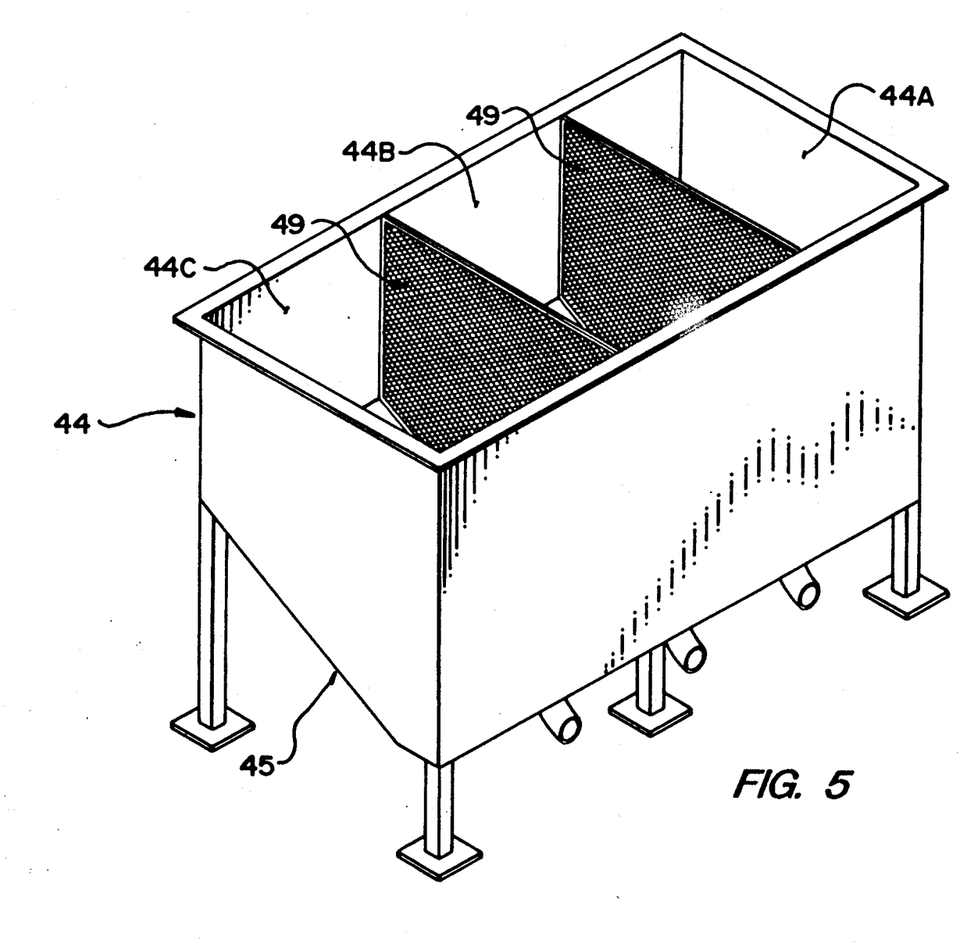
FIG. 5 is a perspective view of the separation sump of the invention.

In this system, however, the separation stage consists of five sump compartments and hydrocyclones. A three-compartment sump 44 (as shown in FIG. 6, but which is illustrated in FIG. 2B as 3 separate sumps for ease of illustration) separates the HDPE from a water slurry, HDPE having a specific gravity less than 1.0. Sump 47 separates the PET from aluminum in a liquid having a specific gravity of about 1.4. Sump 48 separates PVC cap liners from the PET using a liquid having a specific gravity of 1.15. Calcium nitrate solution is the preferred liquid for these applications.

In sump 44, the three compartments are separated by static screens 49 which permit water to flow between the compartments, but not plastic flakes. The bottom of the sump 45 is angled to the horizontal to increase turbulence and prevent the build-up of solids. The dried granular material is first fed to sump 44A from a surge bin (same in structure is sump compartments 24A and 24B) from which the slurry is pumped to hydrocyclone 46A. The high density output of hydrocyclone 46A goes to sump 44 B while the low density output goes to sump 44C. The slurry from sump 44C is pumped to hydrocyclone 46C. The high density output of hydrocyclone 46C goes back to sump 44A while the low density output goes to vibrating screen 48. The solid material from screen 48 goes to a first float sink polishing stage 50 and then to dryer 52, with the liquid from screen 48 and dryer 52 being returned to sump 44A. The dried material from dryer 52, primarily HDPE and polypropylene label material, goes to an air classification stage 51 to remove the lighter density polypropylene.

PET is higher density than HDPE, so sump 44B, has a greater proportion of PET. The slurry from sump 44B is pumped to hydrocyclone 46B. The low density output of hydrocyclone 46B goes to sump 44C while the high density output goes to dewatering centrifuge 58. The solid residue from dewatering centrifuge 58 goes to sump 47, while the liquid residue goes to sump 44C. Sump 47 will contain calcium nitrate or other similar solution at a specific gravity of approximately 1.4 and primarily PET, polyvinylchloride (PVC) from cap liners and aluminum from caps, and its contents are pumped to hydrocyclone 46D. The high density output of hydrocyclone 47 goes through an aluminum screen 59 and then back to sump 47 while the low density output goes to dewatering centrifuge 68. The solid residue from dewatering centrifuge 68 goes to sump 48, while the liquid residue goes to sump 47. Sump 48 contains calcium nitrate at a specific gravity of 1.2–1.3 and primarily PET and PVC. Its contents are pumped to hydrocyclone 46E. The low density output of hydrocyclone 46E goes through a dewatering centrifuge 70 to remove PVC cap liners and then back to sump 48 while the high density output goes to dewatering centrifuge 69. The solid residue from dewatering centrifuge 69 goes to rinse polishing system 21 and then to dryer 16, while the liquid residue goes to sump 48. The dried solid residue from dryer 16 goes to a surge bin 25, then through a metal detector for removal of any remaining metal while the liquid residue goes back to the filters of the hot wash water recovery system.

The cold water wash step of the HDPE system may optionally be added to the system shown in FIG. 2 to adapt the system to handle milk bottles. Also an optional stage may be added to the water reclamation step. The liquid flow from filters in the hot wash system is run through a clarifier. The effluent from the clarifier is stored, along with city water, as make-up water for the plant. The liquid flow from all sludge screens and the remaining flow from the clarifier goes to a drum filter feed sump provided with a mixer and is pumped then through a drum filter, with the filtered water being returned to the system.

Figure 3:
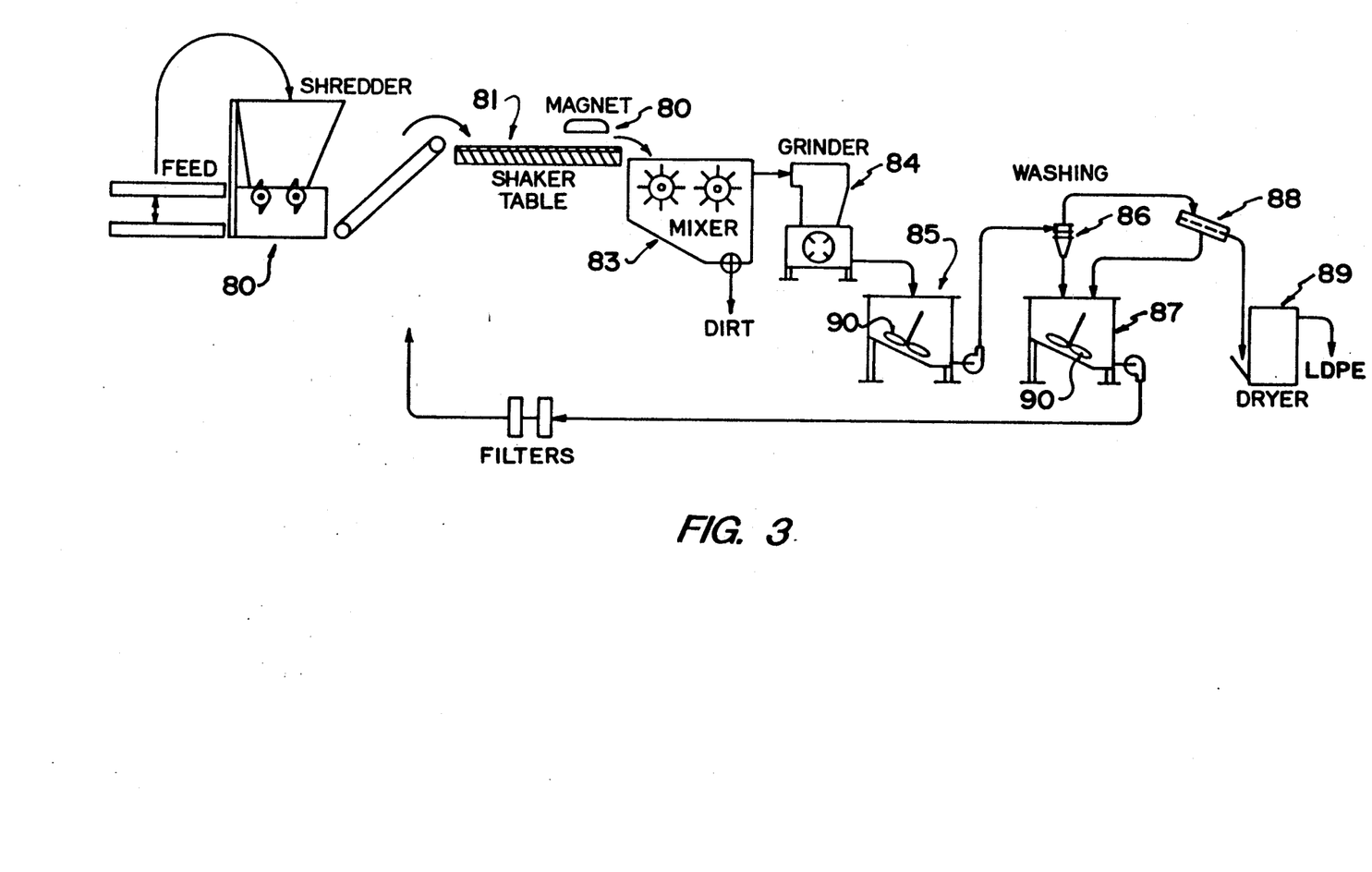
FIG. 3 is a schematic diagram illustrating a system for recycling low density polyethylene plastic.

FIG. 3 is a system for recycling agricultural film, which is a low density polyethylene (LDPE), generally clear from 1 to 6 thousandths of an inch thick used for moisture control on fields and the like. The film tends to contain large amounts of attached dirt and rocks. Bales of the film are fed to shredded 80 from which the shredded material is fed to shaker table 81 which carries off larger rocks and has a magnet 82 for removing ferromagnetic materials. The sifted material is then conveyed to a mixer 83 which removes dirt and then goes to grinder 84. The ground material is added to water in sump 85 which has a mixer 90. Detergent need not be used in the washing stage. The slurry is pumped from sump 85 to hydrocycline 86. The high density output of hydrocyclone 86 goes to sump 87 while the low density output goes to a roller system 88 which squeezes out the water between 12"-diameter urethane covered rollers. The solid residue from rollers 88 goes to dryer 89 while the liquid residue goes back to sump 87. The liquid from sump 87 is filtered, such as by a deep bed filter and returned to the system. The dried LDPE is recovered from dryer 89.

Figure 4A:
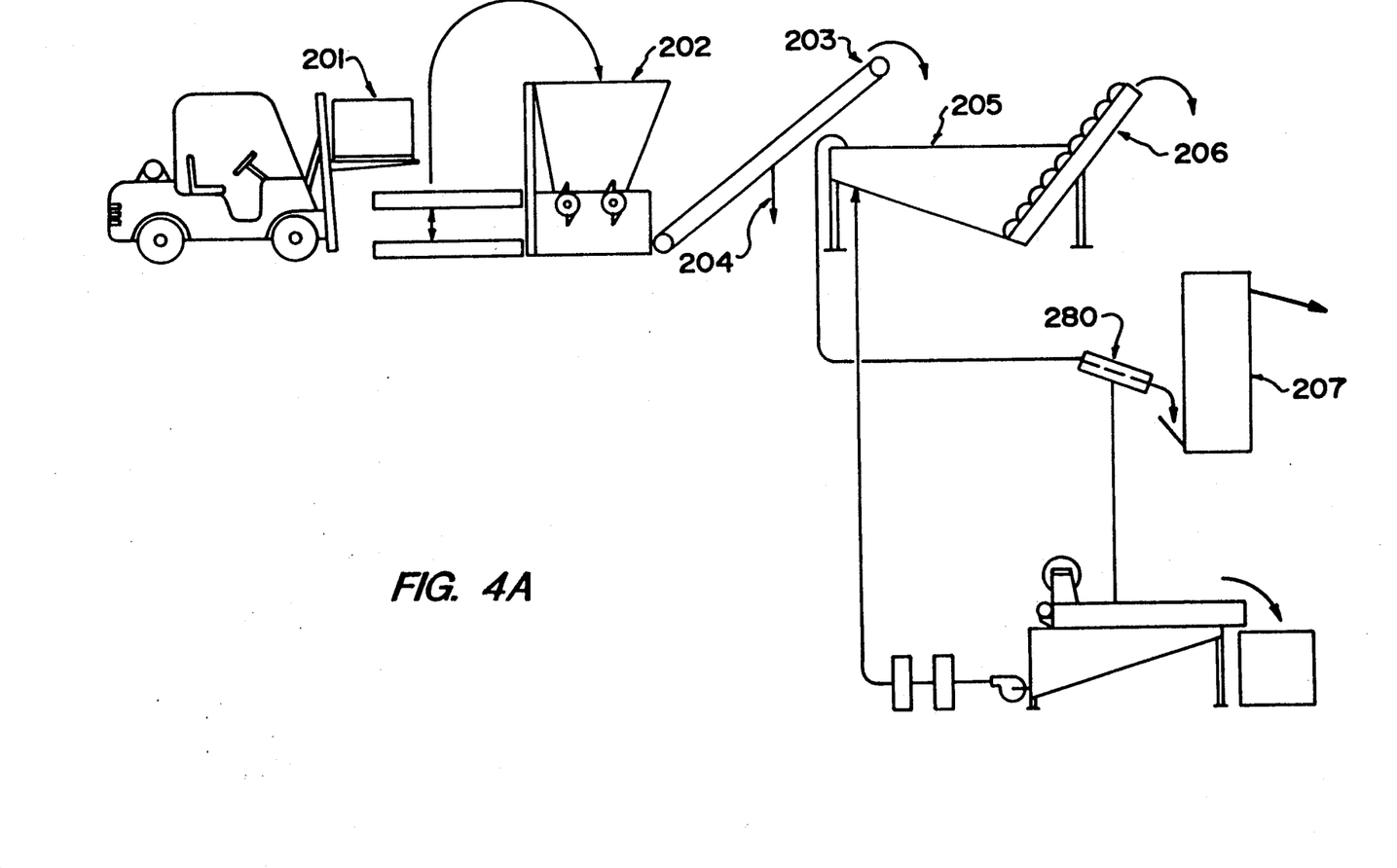
FIG. 4A and 4B is a schematic diagram illustrating a system for recycling polypropylene plastic from medical waste.

FIG. 4 illustrates a medical waste recycling system. Bales 201 of medical waste, which have been sterilized in a steam autoclave or the like, and consist largely of polypropylene plastic, as well as organic materials, glass and metal, are fed into shredder 202 which shreds the material to pieces under 1-inch wide. A magnetic head pulley 203 removes ferrous metals 204. The shredded material enters float-sink tank 205 which has a dewatering screw classifier 206 to remove material which is heavier than water (e.g. glass and metal). Floating material is conveyed to dryer 207 after liquid has been screened off at vibrating screen 280. The dried material goes to granulator 208, from which the material, now under ⅜-inch side, is conveyed to elutriator 230 which removes the lighter materials at 210 by air separation. The heavier materials enter surge bin 209 and are screw fed to hot water wash system 211. The temperatures used for the hot wash are the same as for the milk bottle system above. The washed material is separated in a two-part screen 220, the larger materials going to sump 250 while smaller particles are run through deep bed filter 214 and liquid is mixed in sump 212 then pumped onto the deep bed filter 214. The filtered sludge is removed at 215 and the filtered water being recycled through canister filters 213, reheated at boiler 217 and held in hot water make-up sump 216.

Figure 4B:
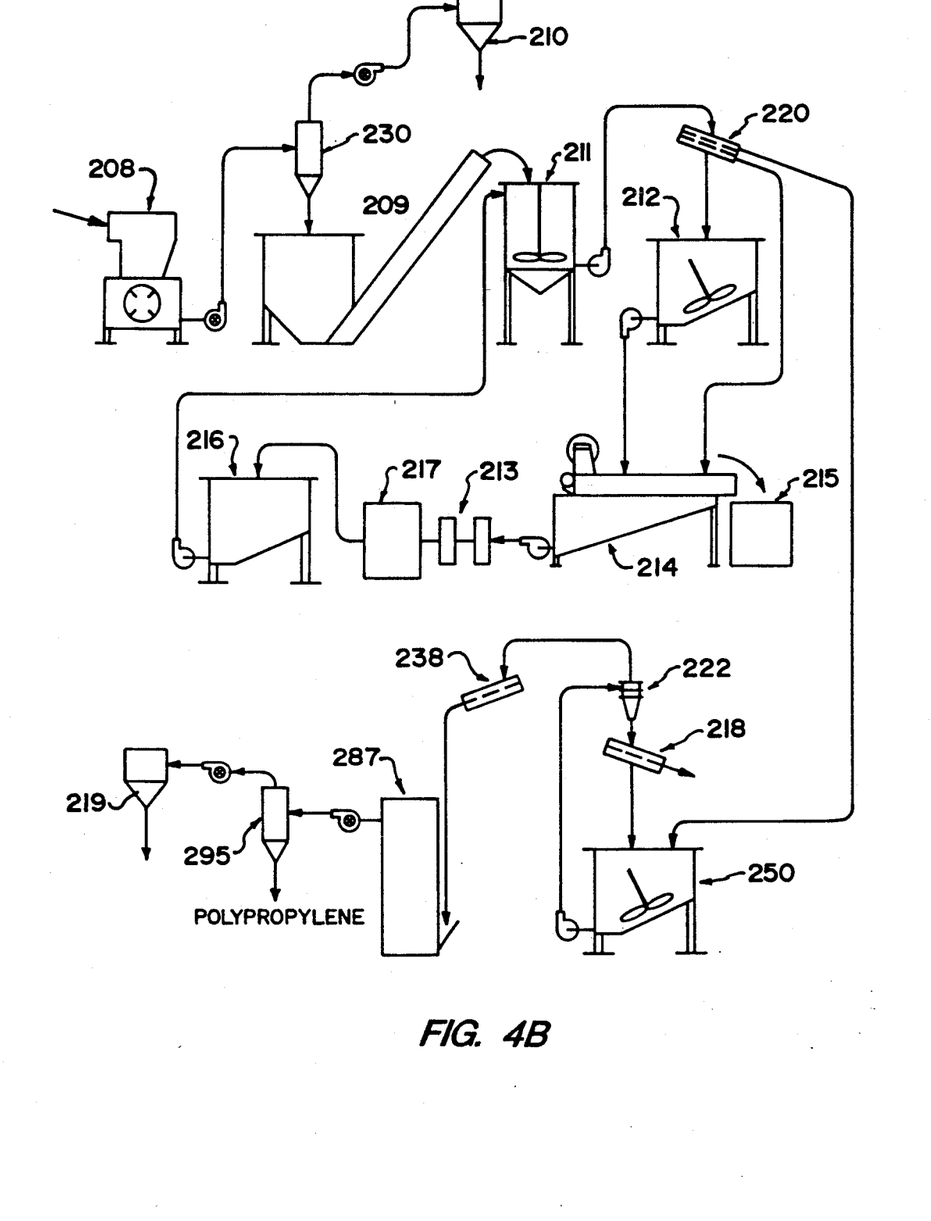

The materials from screen 220 enter sump 250 and are pumped to hydrocyclone 222. The high density output of hydrocyclone 222 goes to sump 250 after heavier contaminants are screened out at 218. The low density output goes to vibrating screen 238. The solid residue from screen 238 goes to dryer 287. The polypropylene is separated from the dried residue at 220 by elutriator 295 leaving fines at 219.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of recycling plastic containers comprising the steps of:
    a) grinding said containers into flake-size plastic pieces approximately ⅜-inch or less in maximum dimension;
    b) removing light materials from said plastic pieces by air classification;
    c) introducing said plastic pieces into a wash bin containing turbulent water at ambient temperature and cold water detergent;
    d) drying said plastic pieces;
    e) introducing said plastic pieces into a wash bin containing turbulent water at a temperature between 180 and 210 degrees F. and hot water detergent;
    f) dewatering said plastic pieces;
    g) separating said plastic pieces from other residue by hydrocylone; and
    h) drying said separated plastic pieces;

wherein said separation step comprises the use of first and second hydrocyclones and a sump comprising first and second liquid-containing compartments, each said compartment having an upper and lower end, said first and second compartments being separated by a liquid pervious screen having a mesh sufficiently small to prevent the passage of said plastic pieces, each compartment being adapted at said upper end thereof to receive a flow of slurry and each compartment provided at the lower end thereof with means for draining said slurry from said compartment, wherein said slurry is pumped first from the lower end of said first compartment to said first hydrocyclone, the low density output from said first hydrocyclone being returned to said second compartment and the high density output from said first hydrocyclone being dewatered to separate solid particles before being returned to said second compartment, and said slurry from said lower end of said second compartment is pumped to said second hydrocyclone, the low density output from said second hydrocyclone then being subjected to said drying step.

2. The method of claim 1 wherein the proportion of plastic pieces to water in step c) is between 1:1 and 1:5, by volume.

3. A method of recycling plastic containers comprising first and second plastics of lower and higher specific gravities respectively, comprising the steps of:
    a) grinding said containers into flake-size plastic pieces approximately ⅜-inch or less in maximum dimension;
    b) removing light materials from said plastic pieces by air classification;
    c) introducing said plastic pieces into a wash bin containing turbulent hot water and hot water detergent;
    d) dewatering said plastic pieces;
    e) forming a slurry in a first sump compartment of said plastic pieces in a liquid having a specific gravity greater than that of said first plastic and less than that of said second plastic;

f) feeding the contents of said first sump compartment to a first hydrocyclone, the high density output of said first hydrocyclone being returned to a second sump compartment and the low density output of said first hydrocyclone being returned to a third sump compartment;

g) feeding the contents of said second sump compartment to a second hydrocyclone, the low density output of said second hydrocyclone being returned to said third sump compartment;

h) feeding the contents of said third sump compartment to a third hydrocyclone, the high density output of said third hydrocyclone being returned to said first sump compartment;

i) dewatering and drying said plastic pieces in said high density output of said second hydrocyclone and said low density output of said third hydrocyclone.

4. The method of claim 3 wherein said first, second and third sump compartments are formed in a sump comprising first, second and third liquid-containing compartments, each said compartment having an upper and lower end, said first and second compartments being separated by a liquid pervious screen having a mesh sufficiently small to prevent the passage of said plastic pieces, and said second and third compartments being separated by a liquid pervious screen having a mesh sufficiently small to prevent the passage of said plastic pieces, each compartment being adapted at said upper end thereof to receive a flow of slurry and each compartment provided at the lower end thereof with means for draining said slurry from said compartment.

5. The method of claim 3 wherein the temperature of said water in step c) is between 190 and 210 degrees F.

6. The method of claim 3 wherein said first plastic is HDPE, said second plastic is PET and said liquid is water.

7. The method of claim 3 further comprising the step of j) forming a slurry in a fourth sump compartment of said plastic pieces from said high density output of said second hydrocyclone in a liquid having a specific gravity greater than that of said second plastic and feeding the contents of said fourth sump compartment to a fourth hydrocyclone, and dewatering and drying the low density output of said fourth hydrocyclone.

* * * * *